(12) United States Patent
Sloan et al.

(10) Patent No.: US 9,434,333 B2
(45) Date of Patent: Sep. 6, 2016

(54) BUMPER BAR

(71) Applicant: Agility Fuel Systems, Inc., Kelowna (CA)

(72) Inventors: Todd Sloan, Kelowna (CA); Chris Forsberg, Kelowna (CA)

(73) Assignee: AGILITY FUEL SYSTEMS, INC., Fontana, CA (US)

( * ) Notice: Subject to any disclaimer, the term of this patent is extended or adjusted under 35 U.S.C. 154(b) by 0 days.

(21) Appl. No.: 14/825,065

(22) Filed: Aug. 12, 2015

(65) Prior Publication Data
US 2016/0082910 A1    Mar. 24, 2016

Related U.S. Application Data

(60) Provisional application No. 62/054,269, filed on Sep. 23, 2014.

(51) Int. Cl.
*B60R 19/42* (2006.01)
*B60R 19/02* (2006.01)
*B60R 19/24* (2006.01)
*B60R 19/48* (2006.01)

(52) U.S. Cl.
CPC ............. *B60R 19/023* (2013.01); *B60R 19/24* (2013.01); *B60R 19/42* (2013.01); *B60R 19/48* (2013.01)

(58) Field of Classification Search
CPC .................... B60R 2015/0675; B60R 15/067; B60R 19/24; B60R 19/48
USPC ........ 293/117, 128; 280/834, 784, 830, 163, 280/164.1
See application file for complete search history.

(56) References Cited

U.S. PATENT DOCUMENTS

| 4,093,254 | A | | 6/1978 | Ezaki | |
|---|---|---|---|---|---|
| 4,098,520 | A | | 7/1978 | Ezaki et al. | |
| 5,054,799 | A | * | 10/1991 | Fingerle | B62D 35/001 280/164.1 |
| 6,053,533 | A | * | 4/2000 | Osborn | B60K 15/067 280/830 |
| 6,347,678 | B1 | * | 2/2002 | Osborn | B60K 15/067 180/68.5 |
| 6,418,962 | B1 | | 7/2002 | Wozniak et al. | |
| 6,755,460 | B1 | * | 6/2004 | Marrs | B62D 33/00 280/833 |
| 6,824,168 | B2 | | 11/2004 | Kawazu et al. | |
| 7,775,537 | B2 | * | 8/2010 | Donnellan | B60R 3/02 280/163 |
| 7,819,431 | B2 | | 10/2010 | Minami | |
| 8,881,933 | B2 | * | 11/2014 | Green | B60K 15/07 220/605 |
| 8,915,322 | B2 | | 12/2014 | Gibb et al. | |
| 2002/0005312 | A1 | * | 1/2002 | Gollungberg | B60K 15/067 180/314 |
| 2005/0211496 | A1 | | 9/2005 | Ito et al. | |

(Continued)

OTHER PUBLICATIONS

"Agility Fuel Systems launches side-mount CNG technology for Class 7 and 8 trucks" NGV Journal [online]. Apr. 1, 2014. Retrieved on Nov. 13, 2015. Retrieved from the Internet: .http://www.ngvjournal.com/agility-fuel-systems-launches-side-mount-cng-technology-for-class-7-and-8-trucks.figure 1 of p. 2, paragraphs 2-3 of p. 2.

(Continued)

*Primary Examiner* — Jason S Morrow
(74) *Attorney, Agent, or Firm* — Wilson Sonsini Goodrich & Rosati

(57) ABSTRACT

The invention provides devices, systems and methods for absorbing and distributing an impact of a vehicle with another object. The force is absorbed by a bumper bar that extends from the vehicle. The bumper bar distributes the force between a fuel container and a frame or bracket in which the fuel container is attached to the vehicle.

20 Claims, 16 Drawing Sheets

(56) References Cited

U.S. PATENT DOCUMENTS

| | | | |
|---|---|---|---|
| 2009/0064502 A1* | 3/2009 | Mellis | B21D 5/08 29/897.2 |
| 2009/0114784 A1* | 5/2009 | Tam | B60K 15/067 248/205.1 |
| 2009/0309349 A1* | 12/2009 | Yamanami | B60K 15/07 280/830 |
| 2010/0301084 A1* | 12/2010 | Johnson | B60K 15/067 224/555 |
| 2012/0161430 A1* | 6/2012 | Mulanon | F17C 13/084 280/834 |
| 2012/0183370 A1 | 7/2012 | Mulanon | |

OTHER PUBLICATIONS

International search report and written opinion dated Dec. 17, 2015 for PCT Application No. PCT/US2015/050738.

'What is the "actual impact velocities of two colliding objects?" Instructables [online]. Sep. 2, 2014. Retrieved on Nov. 12, 2015. Retrieved from the Internet: 4http://www.instructables.com/answers/What-is-the-actual-Impact-velocifies-of-two-coll.paragraph 6 of p. 8.

* cited by examiner

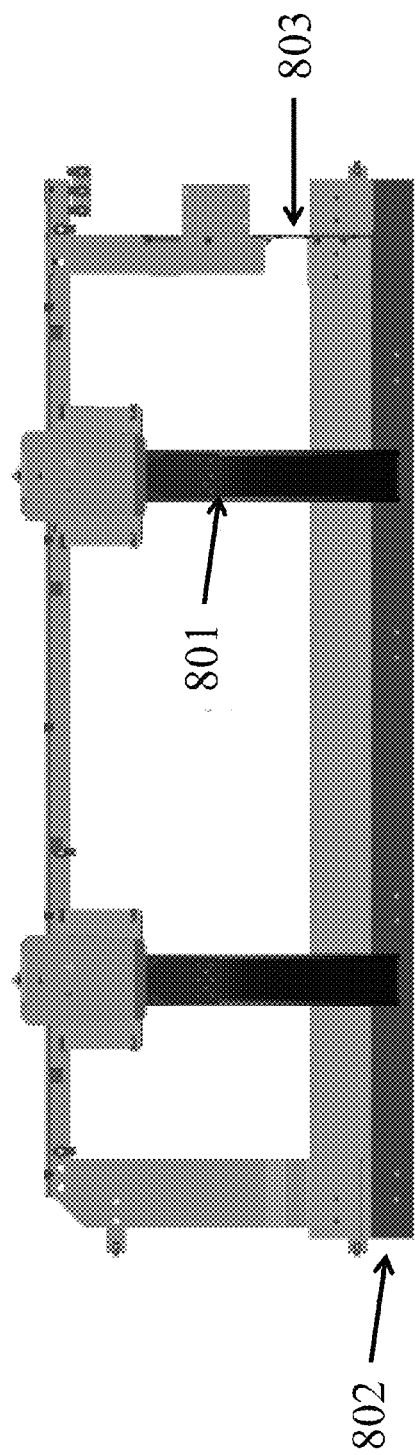
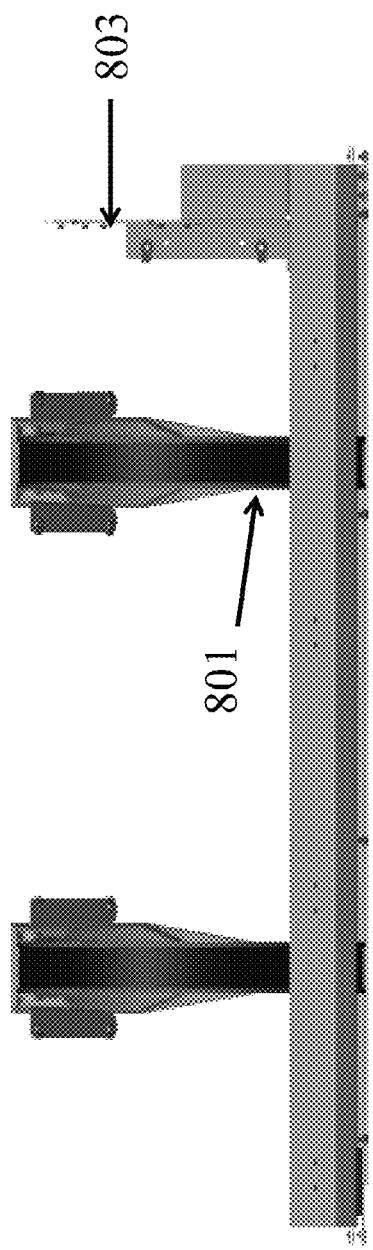
FIG. 8A
FIG. 8B

BUMPER BAR

CROSS-REFERENCE

This application claims priority to U.S. Provisional Patent Application Ser. No. 62/054,269 filed Sep. 23, 2014, which is entirely incorporated herein by reference.

BACKGROUND OF INVENTION

Safety and reliability requirements for alternative fuel systems for vehicles include considerations for filling, storage and delivery of on-board fuel supply. On-board fuel systems can be vulnerable in vehicle crashes and collisions. For example, natural gas may be stored in one or more tanks and used to power a natural gas vehicle. Protection of on-board fuel systems requires infrastructure to absorb forces during crashes and collisions.

SUMMARY OF INVENTION

Recognized herein is a need for improved protection of on-board fuel systems during crashes and collision.

The invention provides devices, systems and methods for absorbing and distributing forces that can be imposed on an on-board fuel storage system during a crash or collision event. The crash or collision event can occur at a relatively high or relatively low speed. An on-board fuel storage system may resemble one or more tanks that may store a fuel such as natural gas. Provided herein is a bracket configured to fasten a fuel tank to an exterior of a vehicle. The bracket further includes a bumper bar that can absorb and distribute forces imposed on the vehicle during a crash or collision event. The invention further provides a cover configured to house the bracket that attaches a fuel tank to the outside of a vehicle. The cover can be removed in one piece to service or monitor the fuel tank.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 8A and 8B are front and back views (respectively) of the bumper bar bracket assembly.

DETAILED DESCRIPTION OF INVENTION

The invention provides devices, systems and methods for absorbing and distributing a force during a collision event. The system included a fuel tank mounting system comprising a bracket, a cover, and a bumper that extends from a side, top, or front of a vehicle and serves as a surface to experience an impact force. The bumper is configured to absorb and transmit the impact force to the fuel tank and to the bracket. The impact can occur at a relatively high, low, or intermediate vehicle speed. In some cases, a relatively low speed impact can occur between a first object and one or more objects moving at less than 5 miles per hour (MPH), less than 10 MPH, less than 15 MPH, less than 20 MPH, less than 25 MPH, or less than 30 MPH. In some instances, an intermediate speed can occur between a first object and one or more objects moving at about 25 MPH, about 30 MPH, about 35 MPH, 40 MPH, 45 MPH, 50 MPH, 55 MPH, or 60 MPH. Optionally a high speed impact can occur between a first object and one or more objects moving at greater than 45 MPH, greater than 50 MPH, greater than 55 MPH, greater than 60 MPH, greater than 65 MPH, greater than 70 MPH, greater than 75 MPH, or greater than 80 MPH. A collision can be an impact between two moving objects or a moving object and a stationary object. An object in a collision can be a vehicle. For instance, both objects in a collision may be a vehicle. Various aspects of the invention described herein may be applied to any of the particular applications set forth below or in any other type of fuel storage/delivery setting. The invention may be applied as a standalone method or system, or as part of an integrated fuel storage/delivery system. It shall be understood that different aspects of the invention can be appreciated individually, collectively, or in combination with each other.

Figure 1:
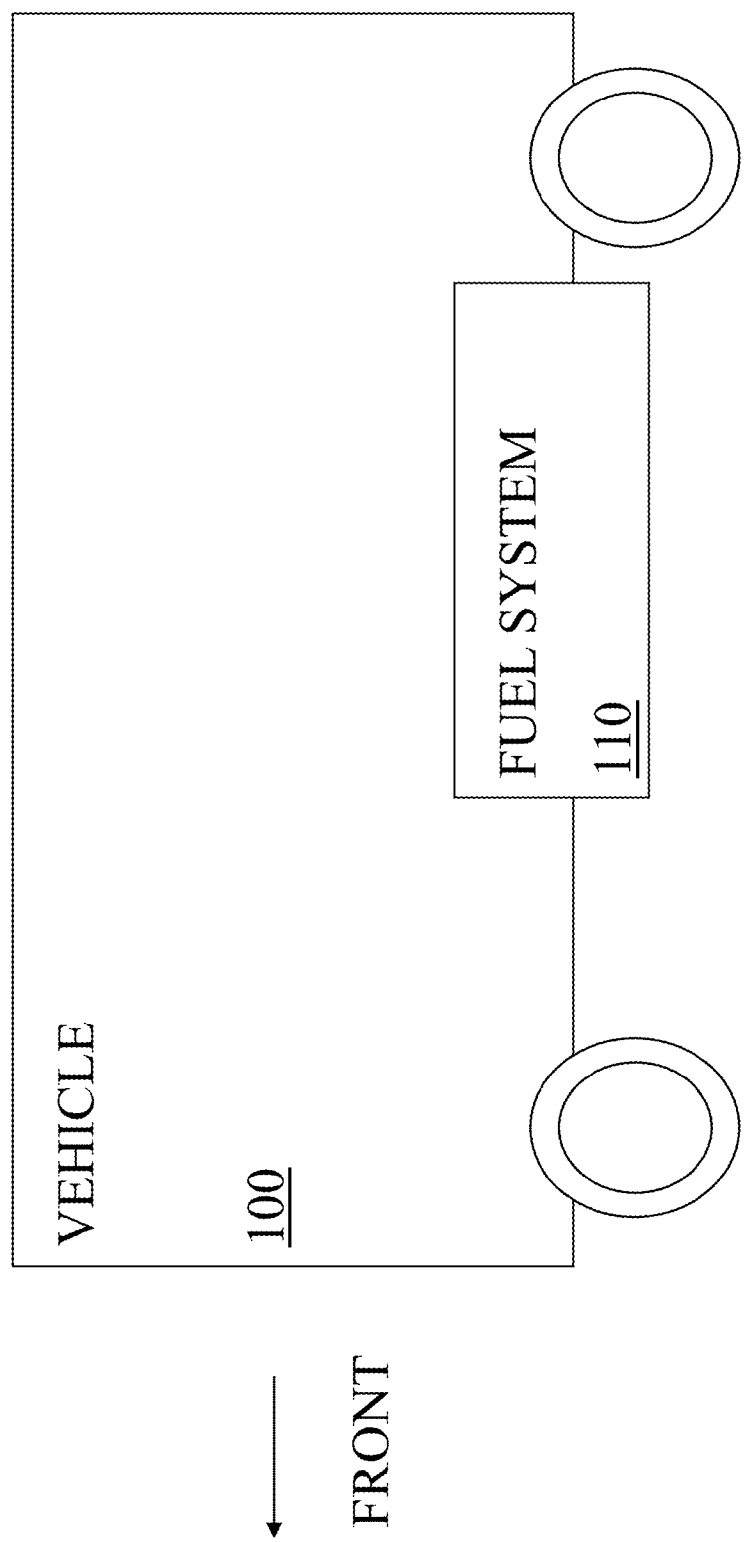
FIG. 1 is an example of a vehicle with an on-board fuel storage system.

FIG. 1A is a schematic of a vehicle 100 with a fuel system 110 mounted thereon. A vehicle 100 may be any type of vehicle known in the art. A vehicle may be a truck, such as a light duty truck (e.g., class 1, class 2 or class 3), medium duty truck (e.g., class 4, class 5 or class 6), or heavy-duty truck (e.g., class 7 or class 8). In some embodiments, the vehicles may be cars, wagons, vans, buses, high-occupancy vehicles, dump trucks, tractor trailer trucks, transit, refuse or heavy-duty vehicles, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs.

The fuel system 110 may be mounted to the vehicle in various configurations. For example, in a side mount configuration, a fuel system 110 may be installed on the side of the vehicle frame rail (not shown). Fuel systems may be installed on one or both sides of the vehicle, providing, for example, standard fuel capacities, measured in diesel gallon equivalents (DGE), of 15 DGE, 30 DGE, 40 DGE, 60 DGE or 80 DGE. In another example, in a behind-the-cab configuration, a fuel system 110 may be installed behind the cab on the vehicle frame rail, providing, for example, standard fuel capacities of 45 DGE, 60 DGE, 75 DGE, 100 DGE, 120 DGE, 135 DGE, or 160 DGE. In a further example, in a roof mount configuration, a fuel system 110 may be installed on the roof of the vehicle body or in a custom integration, providing a wide range of customizable fuel capacities. In an additional example, in a front-of-the-body configuration, a fuel system 110 may be installed in front of the vehicle body, providing, for example, standard fuel capacities of 60-75 DGE. The fuel system may be substantially above the vehicle chassis, below the vehicle chassis, or at the same level as the vehicle chassis.

A vehicle 100 may be propelled by a fuel, including, but not limited to, compressed natural gas (CNG), liquefied natural gas (LNG), liquefied petroleum gas (LPG), dimethyl ether (DME), methanol, ethanol, butanol, Fischer-Tropsch (FT) fuels, hydrogen or hydrogen-based gas, hythane, HCNG, syngas and/or other alternative fuels or fuel blends. For example, natural gas in the form of CNG or LNG may be an alternative fuel of choice for transit, refuse, and many other heavy-duty vehicles.

The fuel may be stored as a compressed gas, as a liquefied gas or as a liquid under its own vapor pressure. The fuel may be stored in an on-board fuel system 110, comprising a fuel tank, vessel, or any other type of device capable of containing a fuel in compressed gas, liquefied gas or liquid form. Any description of a fuel tank herein may also be applied to other types of fuel containing devices.

The fuel tank may be configured in accordance with the chosen fuel storage mode. For example, compressed gases, such as CNG, may require that the fuel tank be outfitted with adequate high pressure components (e.g., high pressure seals, relief valves, compression devices), wherein high-strength and lightweight materials may allow CNG pressures up to, for example, 3,600 psig. In another example, liquefied gases, such as LNG, may require that the fuel tank be outfitted with adequate liquefaction components (e.g., coolers, liquid-vapor separators, insulation). LNG systems may operate at pressures of, for example, 0 psig, 50 psig, 100 psig, 150 psig, 200 psig, 250 psig, 300 psig, or 350 psig and temperatures of, for example, −259° F., −223° F., −200° F., −186° F., −175° F., −167° F., −158° F., or −150° F., requiring the use of cryogenic (about −260° F.) piping systems and vacuum-insulated storage tanks.

In some embodiments, a vehicle 100 may contain a single fuel tank. In other embodiments, the vehicle may contain a plurality of fuel tanks. The tanks may or may not have the same characteristics. The tanks may be mounted to any portion of the vehicle or combinations of portions of the vehicle. In some embodiments, the tanks may be mounted to a side of the vehicle. One, two, or more tanks may be mounted on a single side of the vehicle, or on each side of the vehicle. For instance, the tanks may be mounted on any combination of sides or locations described herein. The side-mounted tanks may at least partially protrude from a side surface of the vehicle. In some instances, the side-mounted tanks may include portions that protrude furthest from the vehicle.

The one or more fuel tanks may provide storage for a predetermined amount, or capacity, of fuel. For example, for natural gas measured in diesel/gasoline gallon equivalents (where 1 gasoline gallon equivalent (GGE)=standard cubic feet (SCF) of natural gas divided by 123, and 1 diesel gallon equivalent (DGE)=standard cubic feet (SCF) of natural gas divided by 139), the amount of fuel provided on-board the vehicle may be, for example, up to about 28 DGE, 45 DGE, 52 DGE, 60 DGE, 63 DGE, 70 DGE, 75 DGE, 80 DGE, 88 DGE, 92 DGE, 140 DGE, 100 DGE, 105 DGE, 120 DGE, 160 DGE 176 DGE, 180 DGE, 185 DGE, 190 DGE, 195 DGE, 200 DGE, 210 DGE, 220 DGE, 230 DGE, 240 DGE, 250 DGE, 260 DGE, 270 DGE, 280 DGE, 286 DGE, more than 286 DGE.

The fuel tank may have any size, shape and/or weight. For example, the fuel tank may be larger than, smaller than, or about the same size as a 5 gallon tank, 7 gallon tank, 10 gallon tank, 15 gallon tank, 20 gallon tank, 25 gallon tank, 30 gallon tank, 40 gallon tank, 50 gallon tank, or 70 gallon tank. The fuel tank may weigh more than, less than, or equal to about 0.01 tons, 0.03 tons, 0.05 tons, 0.07 tons, 0.1 tons, 0.2 tons, 0.3 tons, 0.5 tons, 0.7 tons, or 1.0 tons. For example, the fuel tanks may be of cylindrical form with dimensions (radius in inches×length in inches) of, for example, 25"×61", 25"×80", 25"×90", 26"×80", 26"×90", 26"×120", 26"×76", 16"×80", 21"×86", 16"×120", 21"×70", 21"×86", and one or more cylinders may be combined to achieve a predetermined total fuel capacity.

The fuel system 110 may be capable of containing a fuel at a predetermined pressure. For example, the fuel system 110 may be capable of containing a fuel having a pressure of less than or equal to about 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less.

The fuel system 110 may have one or more fuel outputs. The fuel output may transfer the fuel to another part of the vehicle 100, such as an engine. In one example, the fuel may be output to mix with air in the cylinder of an engine. The fuel may be used in the process of propelling the vehicle. Further, the fuel system 110 may have one or more fuel inputs. The fuel inputs may transfer the fuel from an external fuel supply to another part of the vehicle 100, such as the one or more on-board fuel tanks.

Figure 2:
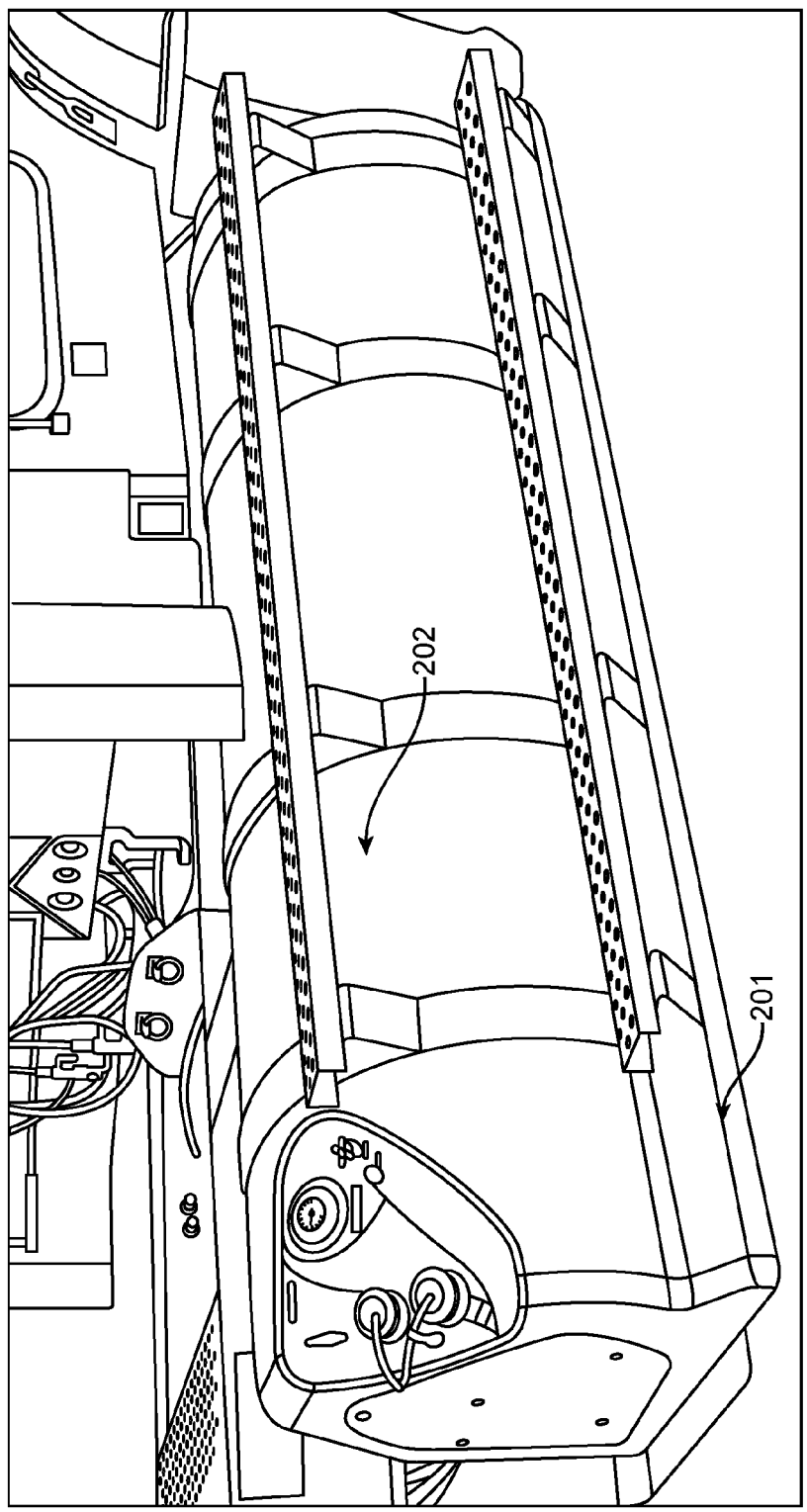
FIG. 2 is a mounting system comprising a bracket, bumper, cover system installed on a vehicle with a step assembly.

The fuel system can be mounted to the outside of a vehicle with a bracket. An example of a fuel system mounted to the outside of a vehicle is shown in FIG. 2. The fuel system can be mounted on the front, rear, side, bottom, or top of a vehicle. The fuel system can be mounted in a location on a vehicle that may experience and impact with another vehicle, a fixed object, a movable object, or a structure while a vehicle is in motion or while a vehicle is stationary. An impact with the fuel system can cause the fuel tank to rupture and spill or leak fuel. Additionally impact with the fuel system can result in a fire or explosion hazard. It may be advantageous to attach the fuel system to a vehicle in a manner such that the fuel system is configured to withstand an impact with another vehicle, a fixed object, a movable object, or a structure. A mounting system may be employed to mount one or more fuel tanks on the vehicle. The mounting system may include a bracket (not shown), a cover 202, and a bumper bar 201. The bumper bar may extend laterally beyond a surface of a tank. The bumper bar may extend further from a central plane along a longitude of the vehicle than any other surface, which may include an outermost surface of the tank. The bumper bar can be the farthest extrusion from a plane containing the vehicle such that when an object collides with the vehicle the bumper bar is a first point of contact. The bumper bar can be configured to receive an impact force and distribute at least a fraction of the force to the fuel tank and the bracket. An impact can generate a force of at least 100 lb (pounds), 1000 lb, 10,000 lb, 20,000 lb, 30,000 lb, 40,000 lb, 50,000 lb, 60,000 lb, 70,000 lb, 80,000 lb, 90,000 lb, 100,000 lb, 200,000 lb, 300,000 lb, 400,000 lb, 500,000 lb, 600,000 lb, 700,000 lb, 800,000 lb, 900,000 lb, 1,000,000 lb, 2,000,000 lb, 3,000,000 lb, 4,000,000 lb, 5,000,000 lb, 6,000,000 lb, 7,000,000 lb, 8,000,000 lb, 9,000,000 lb, or 10,000,000 lb. The bumper bar may be configured to distribute any of these amounts of force. For any of these amounts of force or speeds described herein, the bumper bar may be configured to prevent damage to a corresponding tank. The bumper bar may sufficiently distribute the force to prevent rupture of the tank at impacts of any of the forces or speeds described herein.

Optionally, steps or stairs may be attached to the tank mounting system. The steps or stairs may be supported by a cover for the tank mounting system. The steps or stairs may be supported by a strap that may hold the tank into place. The steps or stairs may be supported by an internal frame structure that may support the tank. The strap and/or supports for the steps may be under a cover for the tank mounting system or over cover for the tank mounting system. Alternatively, the steps may be supported by the cover without being supported by internal structures. In some embodiments, the steps may connect only to an exterior surface of the cover. In some instances, the cover may cover the bumper. The cover may cover portions of the bumper bar and the tank, and may or may not cover the straps and/or supports for the steps.

In some instances, the steps may be separate from the bumper bar. Alternatively, the bumper bar may function as a step. Any description herein of a bumper bar may apply to any bumper bar that may or may not be functioning as a step. In some embodiments, the bumper bar may be located below one or more steps (e.g., at a lower elevation). In some instances, there may be a step that is at a lower elevation than the bumper bar. In some instances, the bumper bar may or may not aid in supporting one of the steps (e.g., from the side, from below). The steps may extend laterally from a tank surface. The steps may or may not extend laterally further than a bumper bar. The steps may or may not be configured to redistribute an impact force. The step may or may not be configured to redistribute the impact force to a bracket. The step may or may not be configured to redistribute the impact force to a tank. The step may be configured to redistribute a fraction of the impact force to the bracket and a fraction of the impact force to the tank. Alternatively, the step may be configured to break off at a sufficient level of impact force, such as any of the values described herein. The step may be configured to crumple at a sufficient level of impact force, such as any of the values described herein.

Figure 3:
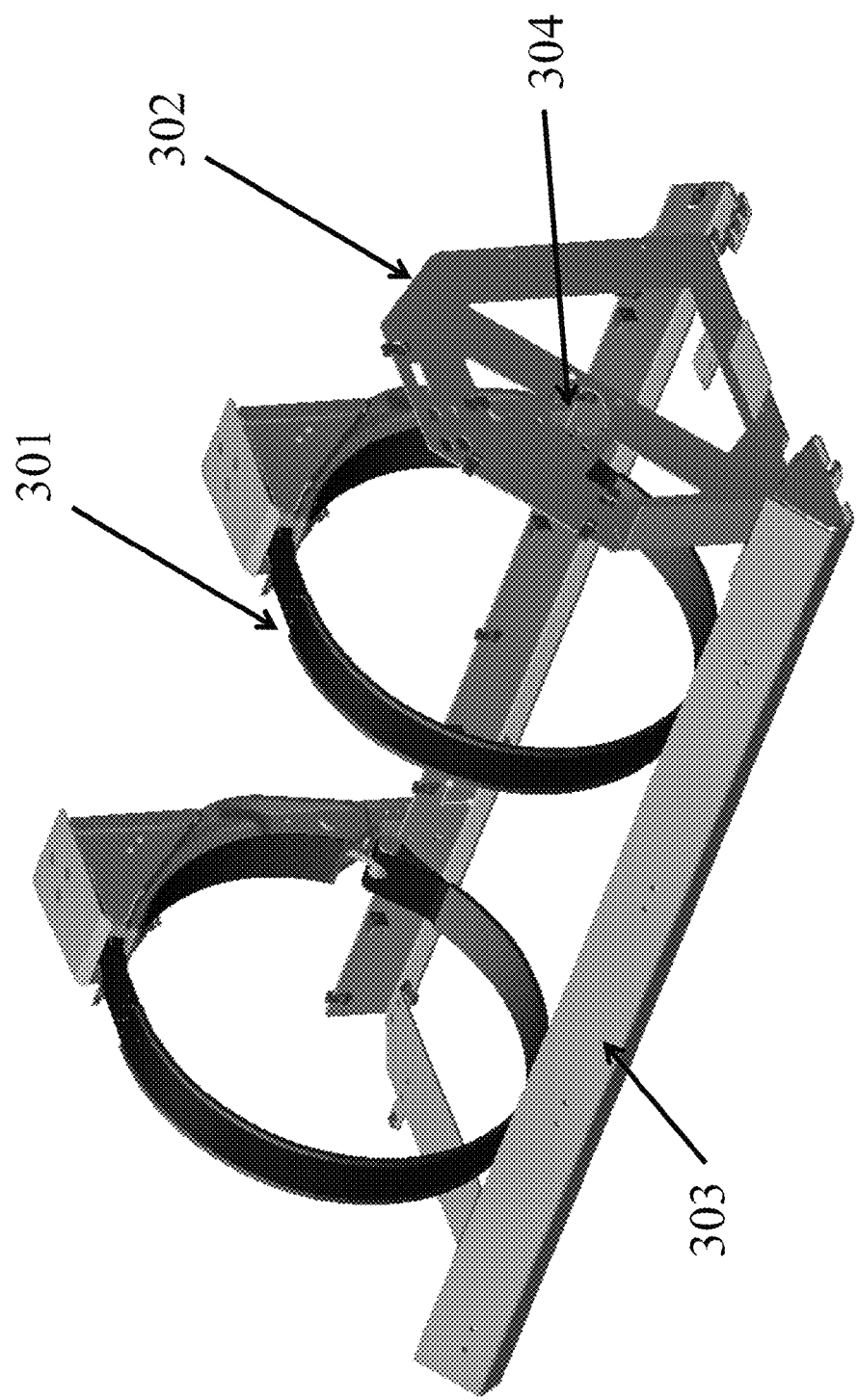
FIG. 3 is an example of a bracket configured to hold a fuel container with a bumper.

A tank can be connected to the outside of a vehicle with a mounting bracket. An example of a possible mounting bracket is shown in FIG. 3. The mounting bracket can be configured to hold a cylindrical fuel tank. Alternatively the mounting bracket can hold a fuel tank with a rectangular cross section. In some cases the mounting bracket can hold a fuel tank with a cross sectional shape of any regular or irregular shape. The mounting bracket may have one or more straps 301 configured to wrap around the outside of a fuel tank. The straps 301 can be adjustable such that they can hold a variety of fuel tank cross sectional shapes and sizes. The straps 301 can be made of a flexible material for example a polymer material, rubber, or nylon. Alternatively, the straps can be made from a metallic material (e.g. steel, aluminum, brass, or titanium) or a composite material. The straps can be rigid. The straps 301 can attach to the bracket with a fastener. In some cases the fastener can be a screw, snap, bolt, rivet or eye bolt. The bracket can have faceplate 302 at a terminal end. The faceplate 302 can be configured to integrate with a fuel management module. The faceplate may configured to support an end of the tank. The faceplate 302 can have an opening 304 that can accept a neck of a fuel tank. The fuel tank neck can be bolted to the faceplate 302. The faceplate can have a plurality of holes to accommodate fastening hardware to secure tanks of different dimensions. In an example, the faceplate can have two holes separated by a first diameter to accommodate fastening hardware for a tank of a first diameter and a second set of holes that are relatively further apart to accommodate a second tank with a relatively larger diameter.

Figure 13:
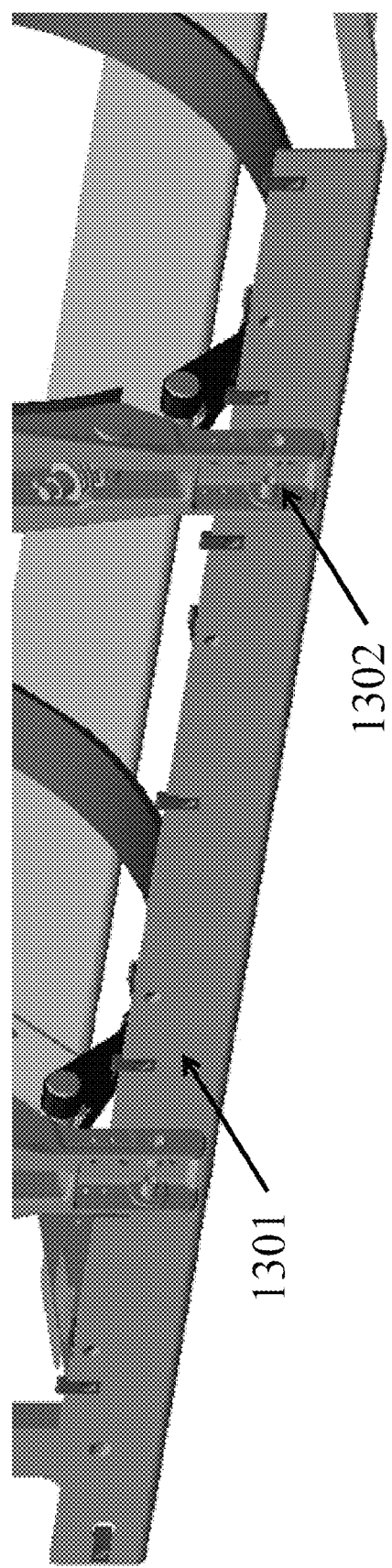
FIG. 13 is a detailed view of a bracket back plate.

The bracket can have a back plate as shown in FIG. 13. The back plate 1301 can provide an additional connection 1302 for the straps. The back plate can be cast or welded to the other bracket components. The back plate can be made from a metallic, polymeric, or composite material. The back plate 1301 or the strap attachment portion 1302 can be used to connect to the frame or chassis of the vehicle. The strap attachment portion may be configured to drop down onto a portion of the frame or chassis to form the connection. A hooking mechanism may aid in attaching the strap attachment portion to the frame. One or more mechanical fasteners may be used to attach the strap attachment portion and/or the back plate to the frame. The strap attachment portion may include a substantially flat rear portion to align with the frame of the vehicle. The strap attachment portion may include a curved or contoured surface for the side facing the plate.

The bracket can have a bumper 303. The bumper 303 can extend from the bracket such that when a tank is installed in the bracket the bumper extends farther from the vehicle than the tank. The bumper can extend out from the tank at least 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, or 20 cm. The bumper may extend from the furthest extending portion of the tank by at least any of the values described herein. The bumper may extend from a recent portion of the tank where the bumper is located by any of the values described herein. The bumper 303 can extend out away from the vehicle farther than any other feature on the vehicle such that the bumper can be the first structure that is encountered when a vehicle is impacted by another vehicle, a fixed object, a movable object, or a structure. The bumper can extend outward in a direction perpendicular to a vertical plane containing the vehicle. The bumper may extend beyond the vertical plane containing the vehicle. The vertical plane may be provided at an outer edge of the tank mounted on the vehicle. The bumper can extend outward from the vertical plane containing the vehicle at an angle of at least 20°, 30°, 45°, 60°, 75°, 90°, 105°, 120°, 135°, 150°, or 165°. The bumper may or may not extend below a horizontal plane intersecting the lowest portion of the tank. The bumper bar may or may not extend above a horizontal plane intersecting the highest portion of the tank.

The bumper can have a cross sectional shape as shown in FIG. 3. The bumper 303 can be a solid bar or a hollow structure. In the case of a hollow bumper, the bumper can have a wall thickness of at least 1/16 inch (in), 1/8 in, 3/16 in, 1/4 in, 5/16 in, 1/2 in, 7/16 in, 3/4 in, 9/16 in, 5/8 in, 11/16 in, 13/16 in, 7/8 in, 15/16 in, or 1 in. In the case of a hollow bumper, there may or may not be any additional internal structures for the bumper. For instance, the hollow bumper may be completely hollow with no internal components. Alternatively, one or more plates or bars may be provided within the hollow bumper. The hollow bumper may include one or more internal cavities. The internal cavities may be filled with air. The air may be ambient air. In some cases the wall thickness may be less than any of the values listed above. In some cases the wall thickness can be in a range between any two values listed.

The bumper 303 may be located at the bottom of the bracket. The bumper can transmit force to the tank and the bracket during an impact. The bumper can have a surface area that can come into contact with another vehicle, a fixed object, a movable object, or a structure during an impact event. The bumper can have sufficient surface area such that the force is spread out and the pressure felt during the impact is decreased. The bumper can contact the fuel tank or fuel cylinder. The bumper can contact a strap that is holding the fuel tank. The bumper can have a contact area with the fuel tank that transmits force from the bumper to the fuel tank during an impact. The bumper can transmit at least 5%, 10%, 20%, 30%, 40%, 50%, 60%, 70%, 80%, or 90% of a force from the impact to the fuel tank. The bumper can transmit less than any of the percentages described to the fuel tank. The bumper can transmit at least 5%, 10%, 20%, 30%, 40%, 50%, 60%, 70%, 80%, or 90% of a force from the impact to the bracket. The bumper can transmit less than any of the percentage described to the fuel tank. In some cases the bumper can transmit a percentage of a decreased impact force to the fuel tank. The impact force can be decreased by losses during the impact. For example an impact can occur at a bumper, in response to the impact the bumper can crumple, experience an increase in temperature, and/or scrape (for example due to friction from sliding with an impacting object). Any single occurrence or combination of crumpling, heating, or scraping of the bumper can result in losses with respect to the force transmitted from the bumper to the fuel tank as a result of the impact. In example the force transmitted to the tank by the bumper can have a loss of at least 10%, 20%, 30%, 40%, 50%, 60%, 70%, 80%, or 90% with respect to the initial impact force exerted on the bumper. The bumper may transmit at least about 20%, 30%, 40%, 50%, 60%, 70%, 80%, or 90% of a force conveyed by the bumper as a result of the impact to the fuel tank. The bumper may transmit less than about 20%, 30%, 40%, 50%, 60%, 70%, 80%, or 90% of a force conveyed by the bumper as a result of the impact to the rear bracket.

The bumper bar may distribute the force between the tank and the bracket in any manner. The bumper bar itself may absorb a portion of the force. In some instances, the bumper bar itself may absorb at least 5%, 10%, 20%, 30%, 40%, 50%, 60%, 70%, or 80% of a force from the impact. Of the force that is not absorbed by the bumper bar, the force may be distributed between the tank and the bumper bar. In some instances, the ratio of force distributed of the tank relative to the force distributed to the bumper bar may be at least 1:20, 1:10, 1:9, 1:8 1:7, 1:6, 1:5, 1:4, 1:3, 1:2.5, 1:2, 1:1.5, 1:1, 1.5:1, 2:1, 2.5:1, 3:1, 4:1, 5:1 m 6:1 7:1, 8:1, 9:1, 10:1, 20:1. Alternatively, the ratio may be less than any of the values described herein. In some instances, the ratio may fall within a range between any two of the values described herein.

The primary direction of force distributed to the bracket and distributed to the tank may be substantially the same. For instance, the force of impact distributed to the bracket and the tank may be substantially parallel to one another. Alternatively, they may be perpendicular to one another. In some instances, the angle between the primary direction of force distributed to the bracket and the primary direction of force distributed to the tank may be at least 5 degrees, 10 degrees, 15 degrees, 20 degrees, 25 degrees, 30 degrees, 40 degrees, 45 degrees, 50 degrees, 55 degrees, 60 degrees, 65 degrees, 70 degrees, 75 degrees, 80 degrees, or 85 or degrees. Alternatively, the angle may be less than any of the values described herein. The angle may fall within a range between any two of these values described herein. The angle of force distribution may depend on the shape of the bumper bar. For instance, the angle of force distribution may match an angle between a lower surface of the bumper bar and an upper/outer surface of the bumper bar. The angle of force distribution may depend on a location at which the bumper bar contacts the tank or a strap securing the tank. In some instances, the force distributed to the bracket may be substantially lateral. For instance, the force distributed to the bracket may or may not have a vertical component. The force may be laterally distributed to a rear portion of the bracket. The force may be at least partially distributed via the rear portion of the bracket to the frame or chassis of the vehicle. In some instances, the force distributed to the tank may have a lateral component and a vertical component (e.g., upwards or downward component).

The bumper can be made of a material capable of withstanding a compressive force. In an example the bumper can be made of a metallic material (e.g. steel, aluminum, cast iron, titanium), a polymeric material (e.g. plastic, rubber), or a composite material. The bumper can be welded on to the bracket, alternatively the bumper can be part of a part cast from a single integral material. The bumper material can be configured to absorb and dissipate a force. The bumper material and shape can be chosen such that the bumper does not crumple as a result of experiencing an impact. In some cases, the bumper material and shape can be chosen such that the bumper does crumple during an impact. In cases where the bumper is configured to crumple in response to an impact force at least a fraction of the impact force can be absorbed by the crumpling of the bumper such that the force transmitted to the fuel tank and/or the bracket is less than the initial impact force. The bumper may or may not be formed from a malleable or resilient material. In some instances, the bumper may be designed to crumple only when the force if impact exceeds a predetermined threshold.

Figure 12:
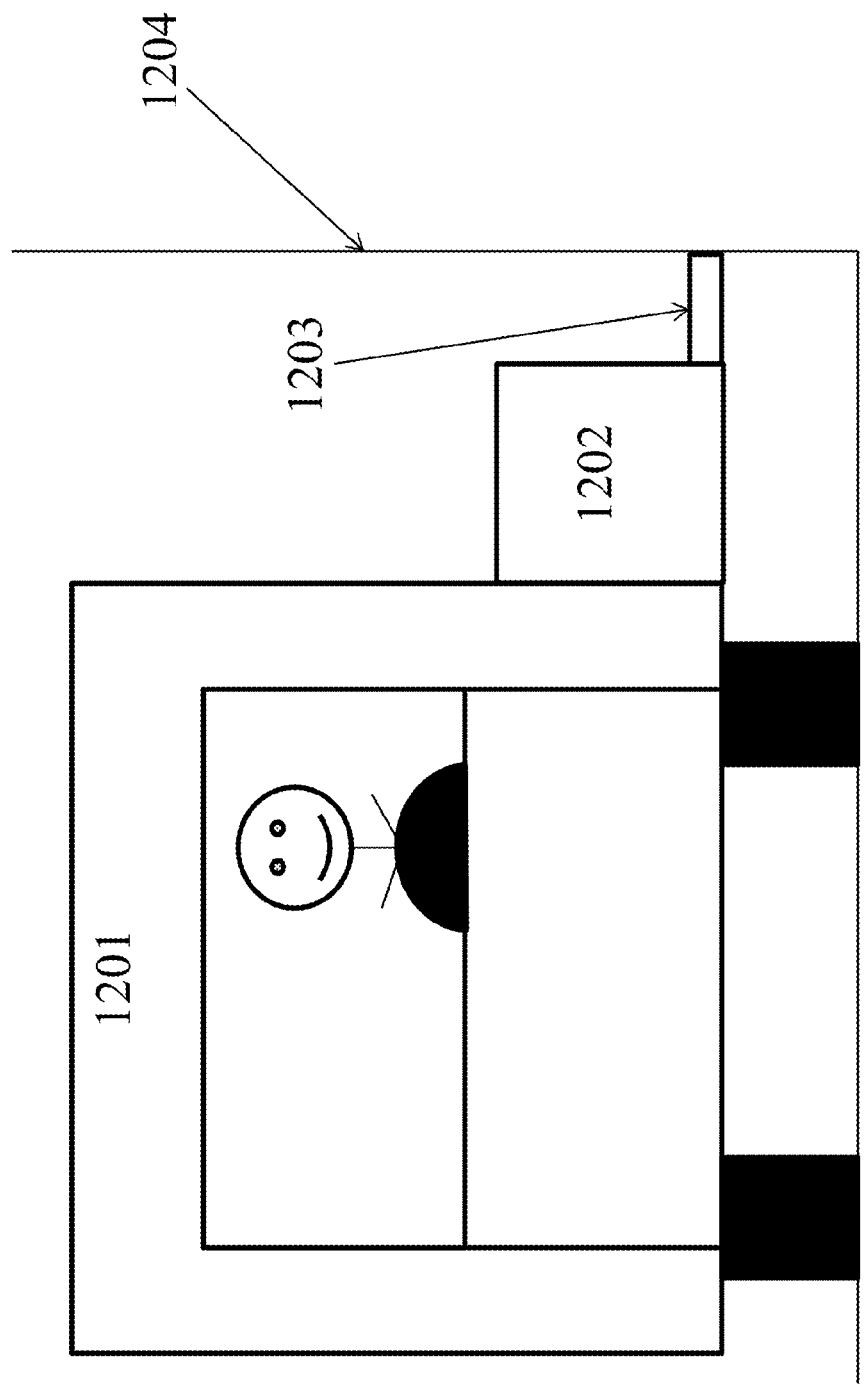
FIG. 12 is an example of a bumper scraping against a wall and protecting a fuel tank from contacting the wall.

The bumper can be resistant to scraping. In some cases the side, top, or front of the vehicle can rub or scrape against a surface. The bumper can be a component of the vehicle that sticks out farthest from the vehicle such that when a vehicle rubs or scrapes against a surface the bumper is rubbed or scraped. The tank may be protected by the bumper and may not be scraped. The bumper can be formed from a material that is resistant to rubbing and abrasion. An example of a tank being protected from scraping by a bumper is shown in FIG. 12. In FIG. 12 a truck 1201 with a fuel tank 1202 is driven close to a wall surface 1204. The wall surface is close to the fuel tank 1202 mounted on the side of the truck 1201. A bumper 1203 extends from the location on the truck where the fuel tank is mounted such that the truck 1201 drives to close to the wall 1204 and causes the bumper 1203 to scrape against the wall instead of the fuel tank. In some cases the bumper can be formed from a material that does not burr or result in jagged or sharp surfaces when scraped such that scrapping of the bumper does not result in a sharp or rough surface that could puncture or irritate a user.

The bumper may be on a side of the vehicle. The bumper may protrude in a direction perpendicular to a primary direction of motion of the vehicle. The side surface may be substantially parallel to a primary direction of motion of the vehicle. The tanks may be side-mounted onto the vehicle such that the bumper protrudes beyond the surface of the tank on the side.

Figure 4:
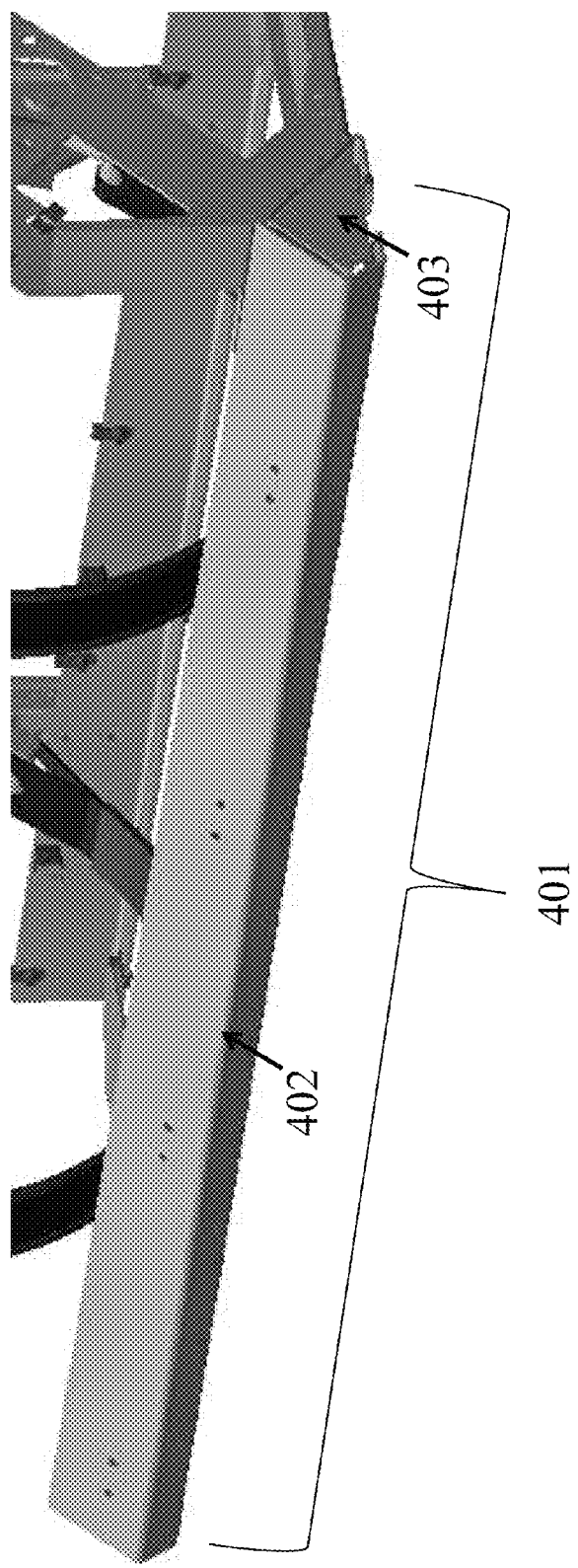
FIG. 4 is a detailed view of an example of a possible embodiment of a bumper.
Figure 14:
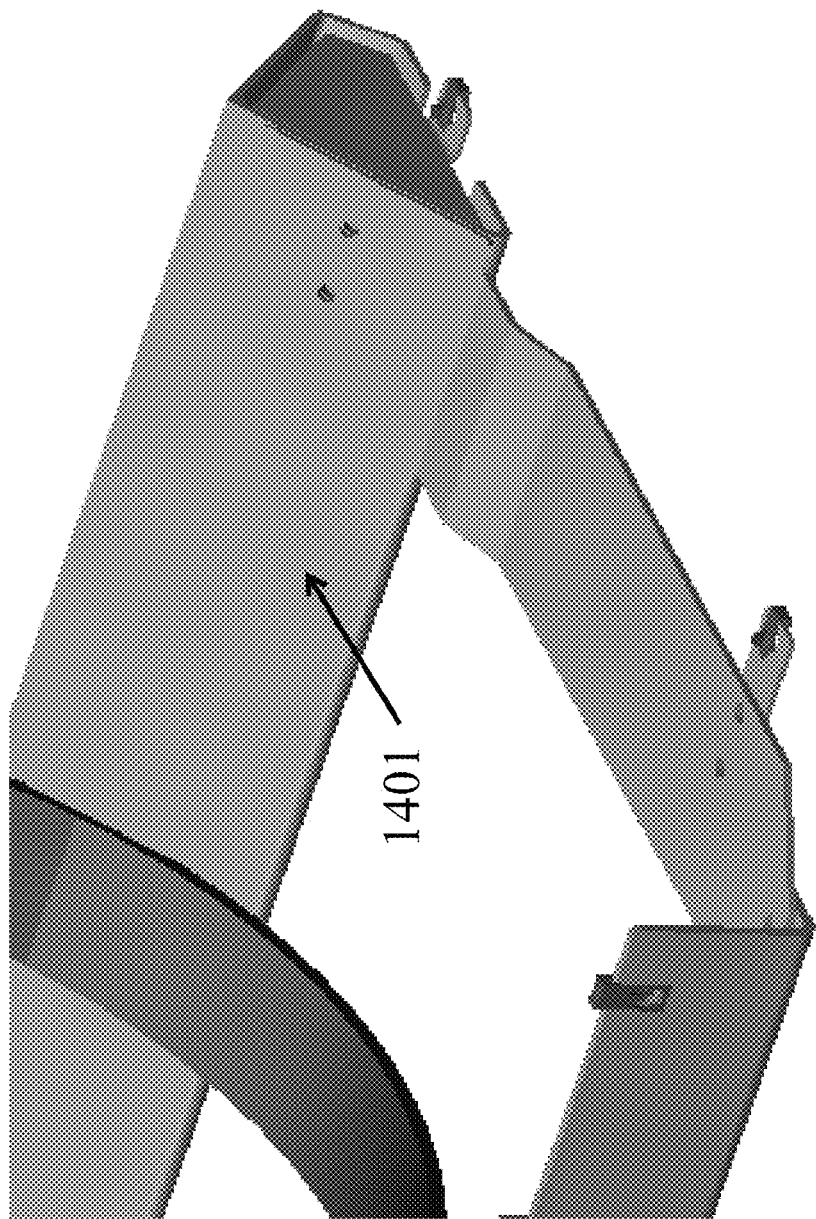
FIG. 14 is a detailed view of a surface of a bumper that can contact a fuel tank surface.

FIG. 4 shows a detailed perspective view of the bumper bar 401. The bumper bar can have an elongated structure 402 that extends along the full length of the bracket. The bumper bar can be a rectangular prism, a cylinder, a triangular prism, a trapezoidal prism, or any other three dimensional bar. The bracket can be configured to have a length such that the bracket is as long as or longer than a tank that is held by the bracket. The bumper can be configured to have a length such that the bumper is as long as or longer than a tank protected by the bumper. The bumper can have end caps 403 on either end of the elongated structure 402. The end cap 403 and the elongated structure 402 can have the same thickness. In some cases the end cap 403 and the elongated structure 402 can have different thicknesses. At least one side of the bumper bar can be configured to be flush with a surface of the tank. The shape of the bumper bar can be chosen such that the bumper bar is configured to distribute an impact force during an impact event. The bumper bar can contact the tank such that the surface area of the tank in contact with the bumper bar is at least 5%, 10%, 20%, or 25% of the total surface area of the tank. FIG. 14 provides a detailed view of a possible bumper surface area 1401 that may be configured to contact the fuel tank when the fuel tank is installed in the bracket. The rear surface area of the bumper 1401 can be configured to contact the contour of a tank mounted in the bracket. The bumper bar can be configured such that it may evenly distribute an impact force over the surface of the bumper bar that is in contact with the tank. In an example, a bumper bar can have a surface area of at least 650 in$^2$ in contact with the tank. The bumper bar can distribute an impact force of 5 million lbs. to the surface of the tank.

Any of the bumper surfaces (e.g., bottom surface 404a, rear surface 404b, top/outer surface 404c, lower outer surface 404d) may be substantially flat. Alternatively, one or more of the surfaces may be curved. In one example, a surface may be curved (e.g., rear surface) to contour to a shape of the tank or a strap securing the tank. The surfaces may form sharp edges with one another, or may have rounded or curved connections to one another. The opposing bumper surfaces may or may not be parallel to another. In some instances, there may be at least one pair, or at least two pair of opposing bumper surfaces that are not parallel to one another. In some instances, at least one of the bumper surfaces may have a width different from the other surfaces. Optionally, each bumper surface may have a different width from one another.

Optionally a bottom surface of the bumper may be oriented in a substantially lateral direction. The other surfaces of the bumper may have a lateral and/or a vertical component to their orientation. In some instances, at least one of the surfaces (e.g., lower outer surface) may have a substantially smaller width than one or more of the other surfaces. For instance, the width may be less than or equal to 60%, 50%, 40%, 30%, 20%, 15%, 10%, or 5% of the width of one or more of the other surfaces.

The bumper may be formed from a sheet material that may be folded or bent to form a cross-section. In some examples, the sheet material may be a sheet metal that may be folded or bent to form the cross-section. The material may be folded and bent to form a closed cross-section or an open cross-section. A closed cross-section may include the sheet material being connected to itself to form an uninterrupted cross-section. For example, the sheet material may be connected to itself via welding, adhesives, soldering, brazing, mechanical fasteners, folding, or other techniques. An open cross-section may be missing at least one side so that the sheet material does not connect back to itself (e.g., C-shaped cross-section). In some instances, the bumper may be formed via extrusion, machining, casting, vacuum forming, or other techniques.

Figure 5B:
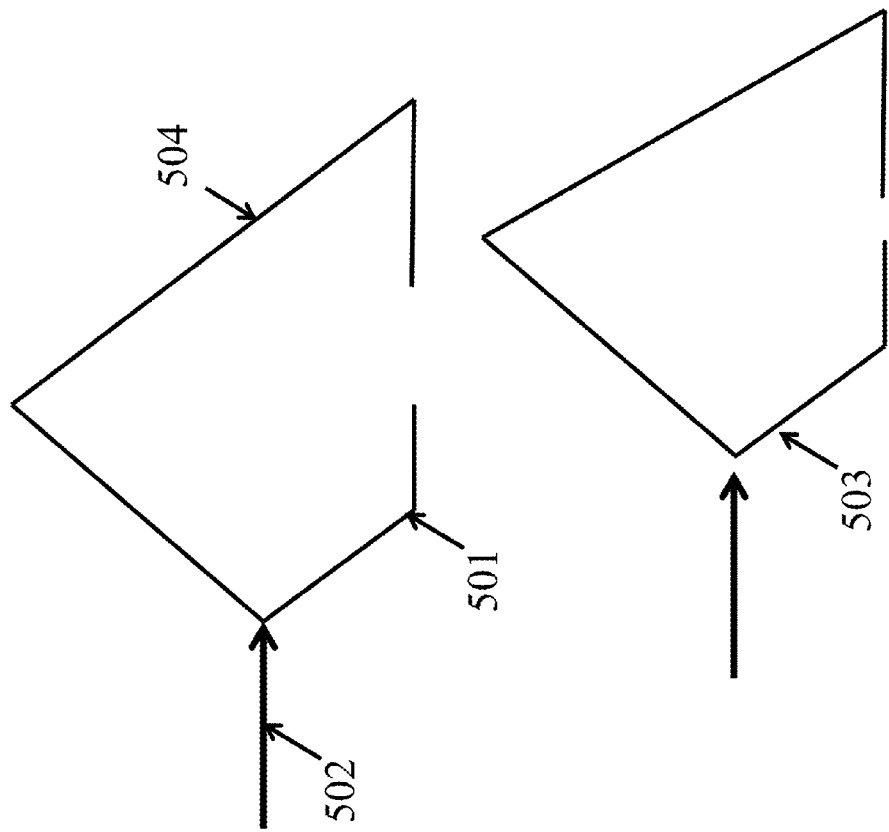
FIGS. 5A and 5B are examples of possible bumper cross sections and a possible response to an impact force on a bumper.
Figure 5A:
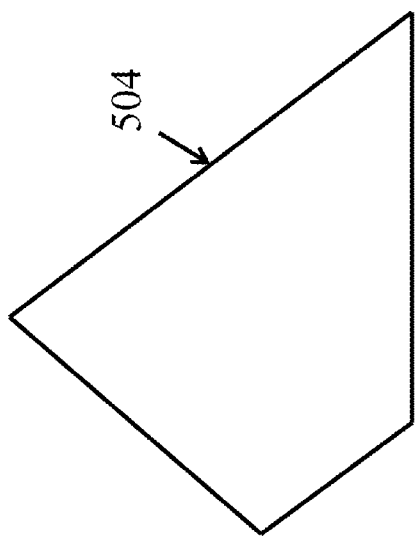

The bumper can have a continuous cross section as shown in FIG. 5A. The continuous cross section of the bumper can be the cross section shown in FIG. 5A, alternatively the continuous cross section can be another shape. At least one surface of the bumper can be in contact or flush with the tank. In some cases the longest side of a cross section of the bumper can be the side of the bumper in contact with the tank, for example side 504 in FIG. 5A. The side of the bumper in contact with the tank can be a straight line. In some cases, the side of the bumper in contact with the tank can be curved to accommodate a curved surface of a tank. The side of the bumper in closest to the tank may have a greater length than an opposing side of the bumper that is furthest from the tank. In some instances, the side of the bumper closest to the tank may have a length greater than about 30%, 50%, 70%, 100%, 150%, 200%, 300%, or 400% of the length of the side furthest from the tank. The side furthest from the tank may be straight or curved. In an example, the continuous cross section can be a square, diamond, rhombus, triangle, trapezoid, circle, semi-circle, or another regular or irregular shape. The bumper bar cross section can be configured to withstand force in a specified position vector. For example a bumper bar cross section can be designed to withstand a vertical force, a horizontal force, or a force with equal or non-equal horizontal and vertical component forces. The force can be a compression, tension, or torsion force. Different location in the bumper bar can experience a mixture of compression, tension, or torsion forces.

In some cases the bumper bar can have a discontinuous cross section. The cross section may have an opening. The opening can be on the top, bottom, or side of the cross section. The opening can have a length that is less than 10%, 20%, 30%, 40%, 50%, 60%, 70%, 80%, or 90% of the length side of the cross section with the opening. In some instances, the opening may be at or near an edge of a side, or may be surrounded on both sides but substantially coplanar portions of the side. Only one side of the cross section can have an opening. An example of a discontinuous cross section is shown in FIG. 5B. The discontinuous cross section can enable the bumper to deform during an impact. The deformation of the bumper bar can be substantially elastic. In some cases the deformation can be plastic deformation or in the transition regime between elastic and plastic deformation. In the example shown in FIG. 5B the bumper bar has a cross section with a bottom opening 501, upon exertion of a force 502 on the bumper bar (e.g. a force resulting from a collision or impact) the bumper bar compresses to a deformed cross section 503. In a case in which the deformation is elastic removal of the force 502 will cause the bumper bar to return to the initial cross section 501.

Figure 6:
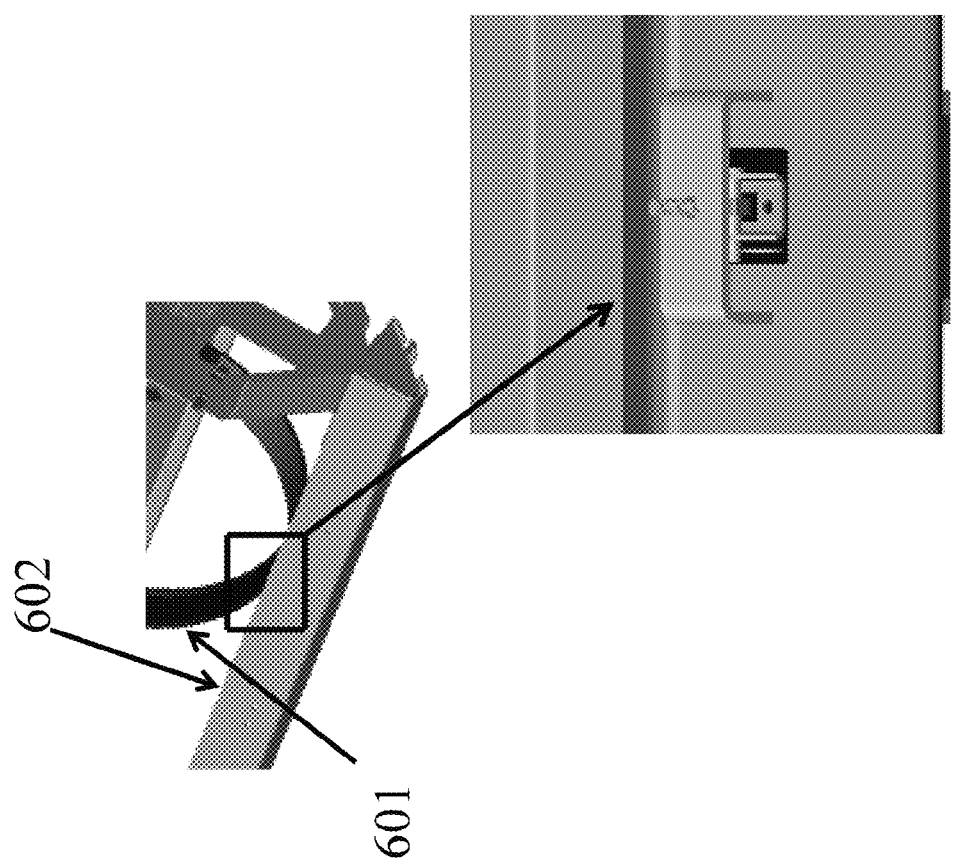
FIG. 6 is a close up view of an attachment of a strap to a bracket where the attachment is located at the bumper.

The bumper bar can be flush with a fuel cylinder or fuel tank placed in the bracket. The bumper bar can transmit a force to the fuel tank during a collision event. The fuel tank can be held in place in the bracket by one or more straps. The straps can wrap around the fuel tank. The straps can be fastened or connected to the bracket. The bumper can transmit force to the straps during a collision event. A detailed view of the strap and bracket attachment is shown in FIG. 6. The strap 601 can connect to the bracket on the inner side of the bumper 602. FIG. 6 shows a detailed view of a possible connection mechanism between the inner side of the bumper 602 and the strap 601. The connection can be achieved with a permanent or removable fastener. In an example the fastener can be an eye bolt. The connection between the strap and the inner side of the bumper can be configured such that stress concentrations on the bumper and connection hardware are minimized when impact forces are imposed on the bumper.

Figure 7:
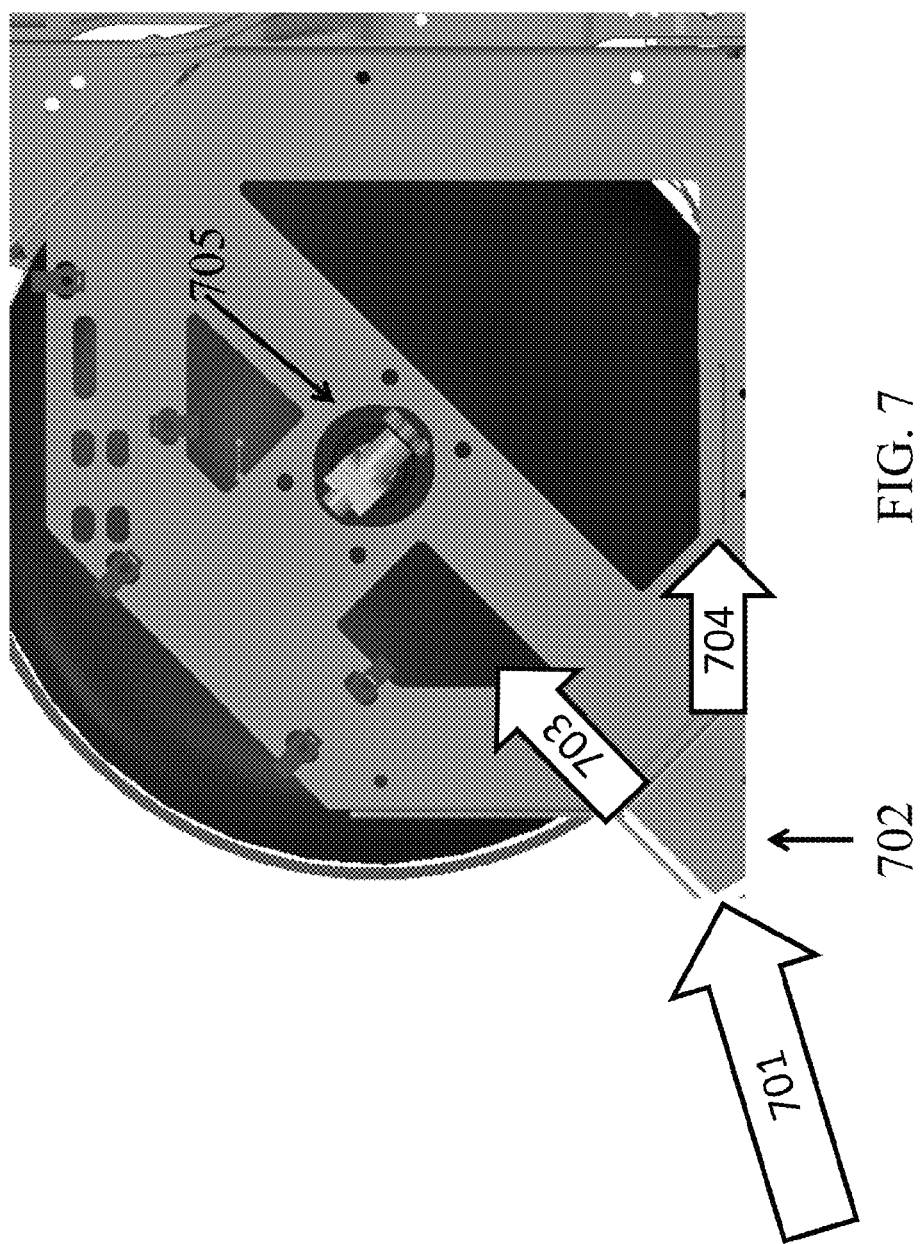
FIG. 7 is an example of a possible force distribution by a bumper.

The bumper can be configured to distribute an impact force between the bracket frame and the fuel tank or cylinder. In some cases, the bumper can be configured to distribute the impact force from the bumper into a vehicle frame, without the force being distributed to the tank in this case. The bumper can distribute force around the tank and to a vehicle chassis or frame. FIG. 7 shows a possible force diagram that could describe an example of the redistribution of the impact force by a bumper. In the example shown in FIG. 7 a bumper 702 can experience a collision causing an impact force 701. The impact force 701 can be transmitted through the bumper 702 to the cylinder or fuel tank through force 703 and to the bracket through force 704. The tank can be rigidly held in place by a bracket connection 705 such that the tank may experience little or no movement as a result of receiving an impact force. In some instances, one or more straps or holders of the tank may be designed to hold the tank without breaking, even if force is distributed to the tank via the bumper bar. The bracket may directly connect the bumper bar with a surface of the vehicle. For example, the bracket may directly connect the bumper bar to a side surface of the vehicle without any additional separate intermediate components. The sum of forces 703 and 704 can equal the original force 701. Alternatively, the sum of forces 703 and 704 can be less than the original force 701 when at least a fraction of the energy of the impact is lost in transmission of the force from the bumper 702 to the fuel tank and the bracket frame. The impact force can be distributed to the tank over a large area such that the tank is not bruised or cut by the impact force. The bumper can decrease the pressure exerted by the impact force by transmitting the force to a relatively large surface area of the tank. The tank can remain stationary during an impact event. The bracket can withstand the impact without breaking, denting, or bending. The tank can further distribute the force to a vehicle frame. Distribution of the force from the tank to the vehicle frame can allow the force to be distributed over a larger area of the vehicle frame than could be achieved by distributing the force directly from the bumper to the frame. At least one side of the bumper bar can be configured to be flush with a surface of the tank. The bumper bar can contact the tank such that the surface area of the tank in contact with the bumper bar is at least 5%, 10%, 20%, or 25% of the total surface area of the tank. The bumper bar can distribute an impact force over the area of the tank that is in contact with the tank. In some instances, a force may be transmitted to a bracket in a substantially horizontal direction. Optionally, a force may be transmitted to a bracket at an angle, which may include along one or more supports connecting the bumper to the rear of the bracket. The force on the tank may be distributed by the bumper over a wide area of the tank. The force distributed across the tank may be directed toward the center of the tank, or toward any other angle. The force (e.g., amount or direction) on the tank may be substantially uniform along the length of the tank (e.g., vary by less than 20%, 15%, 10%, 5%, 3%, or 1%). Alternatively, the force on the tank may vary along the length of the tank (e.g., by more than 15%, 20%, 30%, 40%, or 50%). A rear surface of the tank may or may not contact or be near a surface of the vehicle. Force transferred to the tank may or may not contact any other components of the bracket mounting system. In some instances, force transferred to the tank may be transferred to a holding bracket over the neck of the tank. Force transferred to the tank may be transferred to one or more straps holding the tank. Force transferred to the tank via the bumper bar may or may not be transferred to a rear portion of the bracket or a surface of the vehicle.

FIG. 8A and FIG. 8B show a complete front and back view (respectively) of the bracket assembly including the bumper. The complete assembly comprises as shown in FIG. 8A and FIG. 8B shows the following parts of the bracket assembly at least one strap 801, a bumper 802 (only visible in the front view, FIG. 8A), a face plate 803, and a back structure 804. All of the parts can be made from a metallic, polymeric, or composite material. The parts can be made of the same materials or each part can be made of one or more materials that are different from the material of at least one other part. The parts can be welded or cast into the assembly design shown in FIG. 8A and FIG. 8B. The back structure 804 can be configured to be mounted to the top, side, or front of a vehicle. The bracket can be configured to hold a cylinder in place during an impact such that a cylinder stays in substantially the same location during an impact event.

Figure 9:
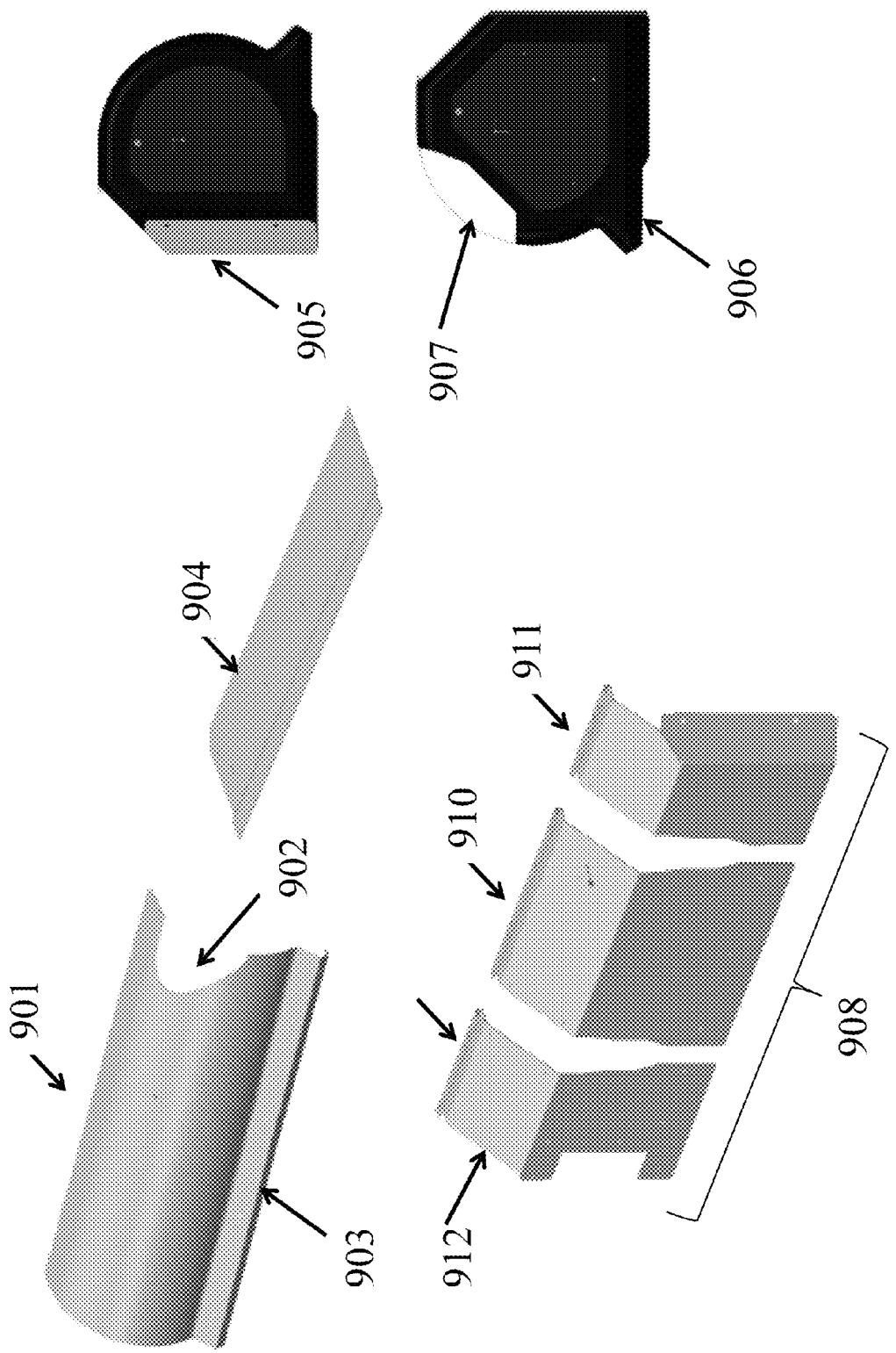
FIG. 9 is an example of the possible cover components.

The entire bracket assembly including the bumper can be enclosed fully or partially by a cover. The cover can be separate and unattached to the bracket such that the cover can be removed without removing the bracket from the vehicle. The cover can fit over the bracket like a skin such that the cover can be shaped to fit snuggly over the bracket. The cover can be free from cut outs. Alternatively, the cover can have one or more holes or cut outs. The cover can have a smooth uninterrupted surface. The cover can be made from a metallic, polymeric, or composite material. The cover can have at least four connected sections. The sections can be removably or permanently connected. Four possible sections that can be connected to form the cover are shown in FIG. 9. The cover can have a top cover 901. The top cover can be formed from a single integral piece of material. The top cover can be configured to fit over a bracket with or without an installed fuel tank or cylinder. The top cover can be made from a rolled metallic material, for example aluminum, steel, brass, copper, or titanium. Alternatively the top cover can be made from a molded plastic or composite material. The top cover can have a thickness of at least 0.005 inches (in), 0.01 in, 0.02 in, 0.03 in, 0.04 in, 0.05 in, 0.06 in, 0.07 in, 0.08 in, 0.09 in, 0.1 in, 0.5 in, or 1.0 in. The top cover can have a cut out 902 configured to provide access to a fuel management module (FMM). The fuel management module can comprise valves, knobs, and removable caps that can be used to put fuel into the tank, remove fuel from the tank, and modulate the flow of fuel from the tank.

A portion of the cover may be configured to cover the tank. The region that fits over the tank may be substantially curved. The shape of the region over the tank may be contoured and shaped to match the shape of the tank.

The cover can further comprise a region configured to fit over the bumper 903. In some instances, an indentation or recessed portion may be provided where the region of the cover that covers the tank meets the region of the cover that covers the bumper. The region that fits over the bumper may be configured to protrude from the rest of the cover surface. The region that fits over the bumper may form a smooth uninterrupted surface with other portions of the cover. The region fitting over the bumper may be contoured and shape to match the shape of the bumper. In some instances, the region fitting over the bumper may have a substantially pointy (and/or rounded) portion protruding from the surface. In some instances, the region may have a substantially flat portion protruding from the surface. The region fitting over the bumper may be located near a bottom portion of the cover. The region fitting over the bumper may or may not support one or more steps. The region may support the steps from the side, bottom, and/or top.

In some instances, the region of the cover overlying the bumper and the bumper may be formed from different materials. In some instances, the bumper may be formed from a material of a greater strength than the material forming the cover. Alternatively, the strength of the material forming the cover may be greater than or equal to the strength of the material forming the bumper. In some instances, the bumper may be configured to absorb more of the force of impact than the cover.

The cover can also have a bottom cover 904. The bottom cover can be configured to fit under the fuel bracket assembly and can mate with the top cover 901. The bottom cover can be made from a formed metallic material, for example aluminum, steel, brass, copper, or titanium. Alternatively the bottom cover can be made from a molded plastic or composite material. The bottom cover can have a thickness of at least 0.005 inches (in), 0.01 in, 0.02 in, 0.03 in, 0.04 in, 0.05 in, 0.06 in, 0.07 in, 0.08 in, 0.09 in, 0.1 in, 0.5 in, or 1.0 in.

The cover can further comprise a side cover or end cap 905. The cover can have a side cover at each terminal end. The one or more of the side covers can be removable such that a side cover can function as a door to access the contents of the cover (e.g. the fuel tank or cylinder and/or FMM components connected to the fuel tank of cylinder). An end cap can be installed adjacent to the top cover cut out 902 which can accommodate an FMM interface or attachment. A similar cut out 907 can be provided on an end cap 906. Such that the three dimensional structure formed by the top cover and the end cap 906 when assembled can be configured for the placement of an external FMM interface. The side cover can be made from a formed metallic material, for example aluminum, steel, brass, copper, or titanium. Alternatively the side cover can be made from a molded plastic or composite material. The side cover can have a thickness of at least 0.005 inches (in), 0.01 in, 0.02 in, 0.03 in, 0.04 in, 0.05 in, 0.06 in, 0.07 in, 0.08 in, 0.09 in, 0.1 in, 0.5 in, or 1.0 in. The cover can have a back cover component 908. The back cover can be three connectable pieces 909, 910, and 911. The back cover can be made from a formed metallic material, for example aluminum, steel, brass, copper, or titanium. Alternatively the back cover can be made from a molded plastic or composite material. The back cover can have a thickness of at least 0.005 inches (in), 0.01 in, 0.02 in, 0.03 in, 0.04 in, 0.05 in, 0.06 in, 0.07 in, 0.08 in, 0.09 in, 0.1 in, 0.5 in, or 1.0 in. The back cover can have an angle 912 such that at least a portion of the cover slants away from a mounting location on a vehicle. The angle 912 can be at least 20°, 30°, 45°, 60°, 75°, 90°, 105°, 120°, 135°, 150°, 165°. Slanting the cover away from the mounting location may allow the cover to be installed in a variety of vehicle configurations without the cover interfering with other vehicle components.

Figure 15:
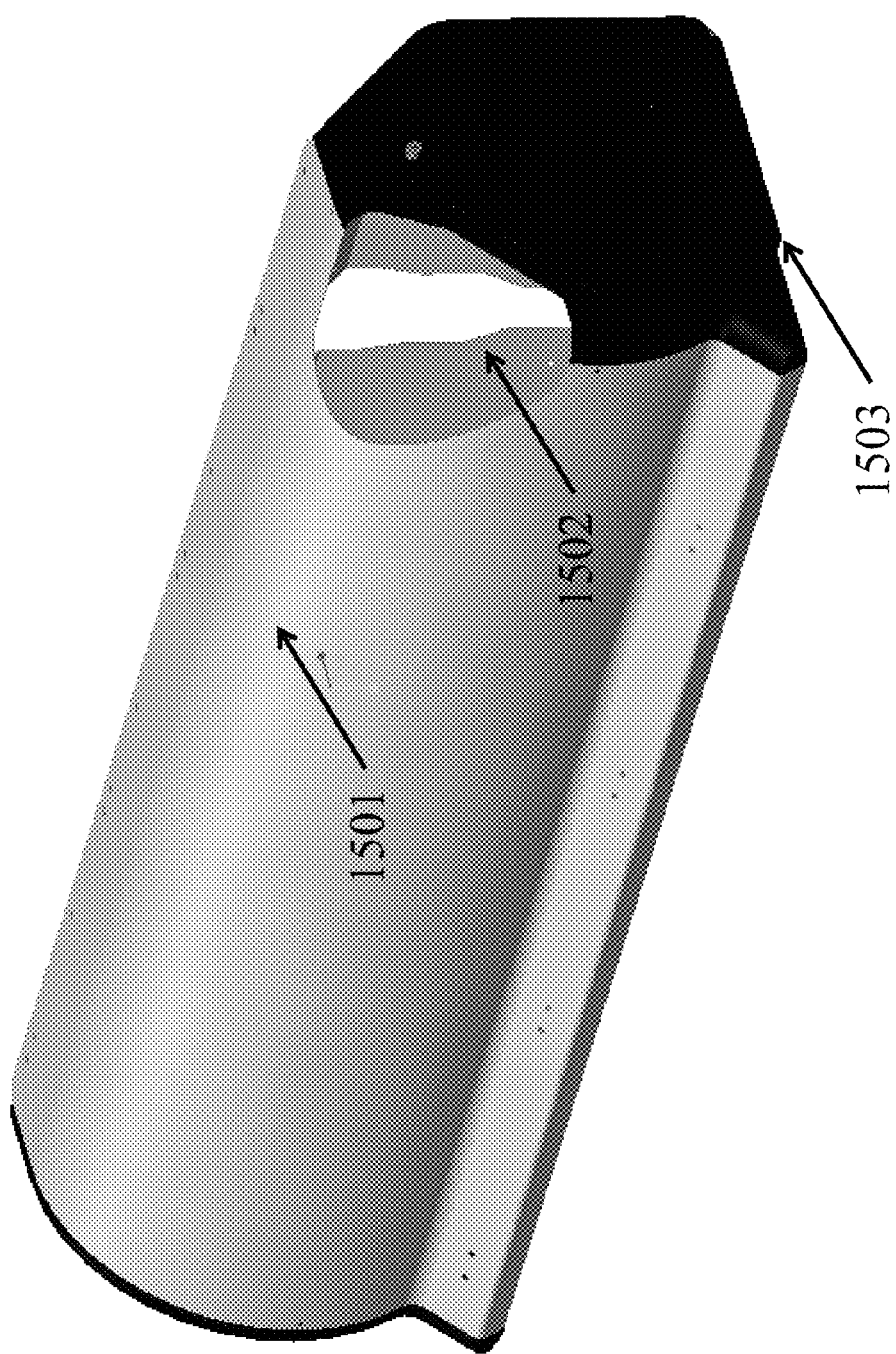
FIG. 15 is a complete view of a cover that can be installed over a bracket and fuel tank.

FIG. 15 shows a complete assembly of the cover 1501. The cover has a recessed region 1502 configured to fit a fuel management module interface. The complete cover assembly 1501 includes ends 1503 that can be removed to access the interior of the cover.

Figure 10:
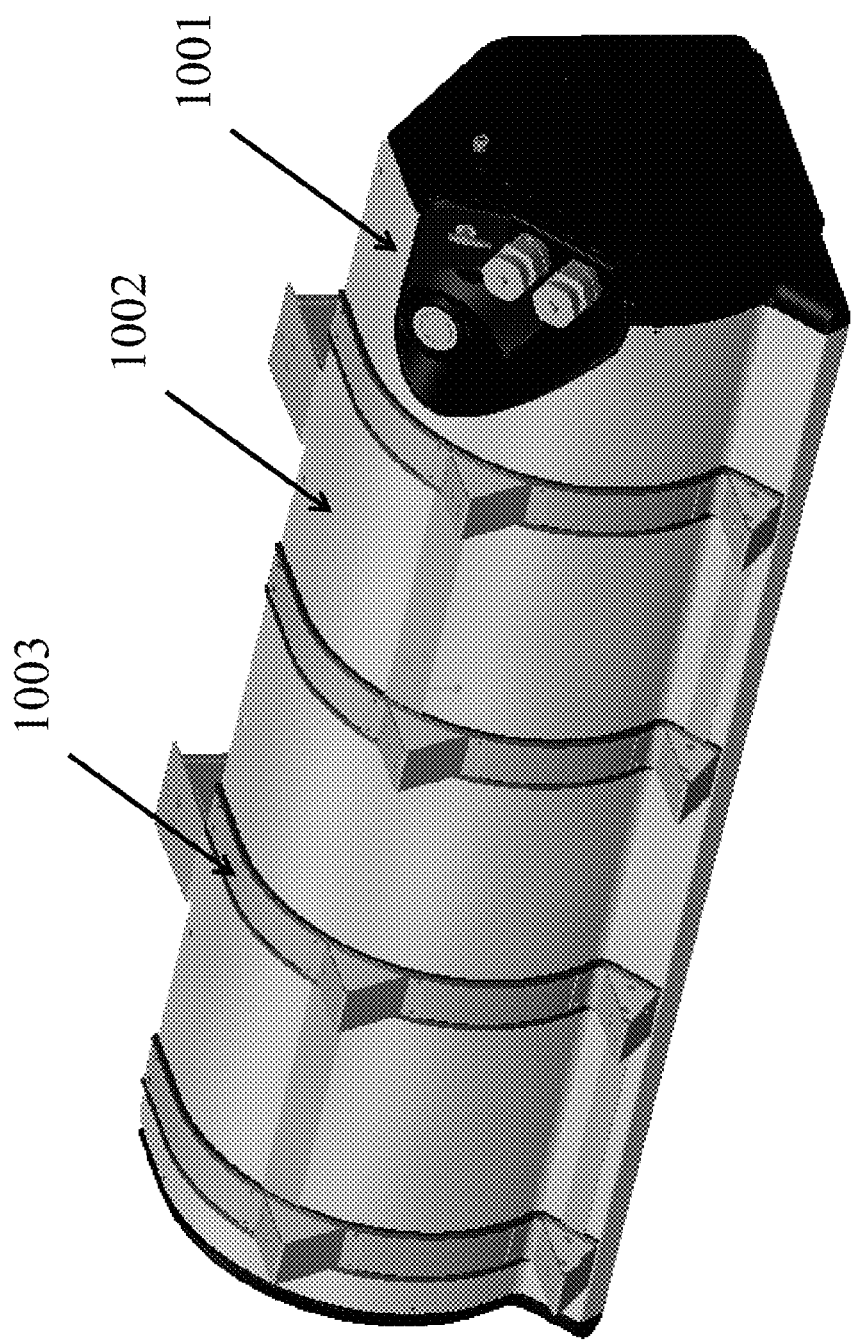
FIG. 10 is the complete cover and stair assembly with a fuel management system interface shown.
Figure 11:
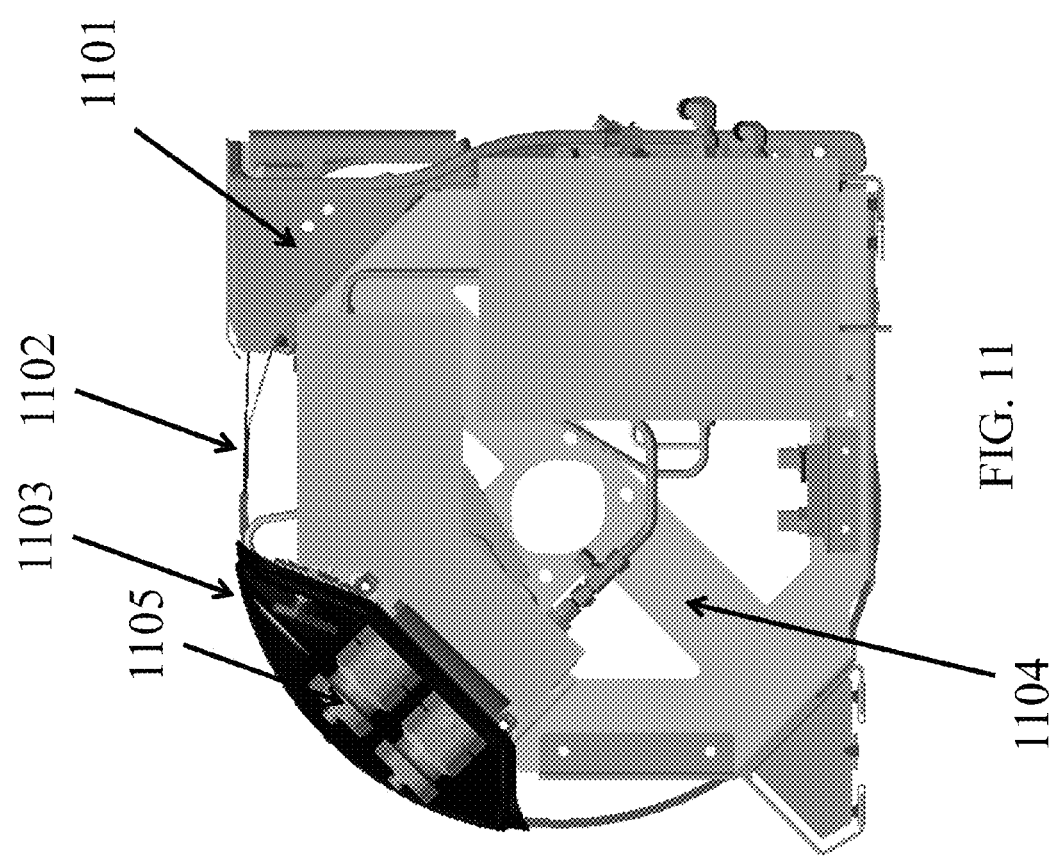
FIG. 11 is a cross sectional view of a fuel management system attached to a bracket assembly and accessible from a cover.
Figure 16:
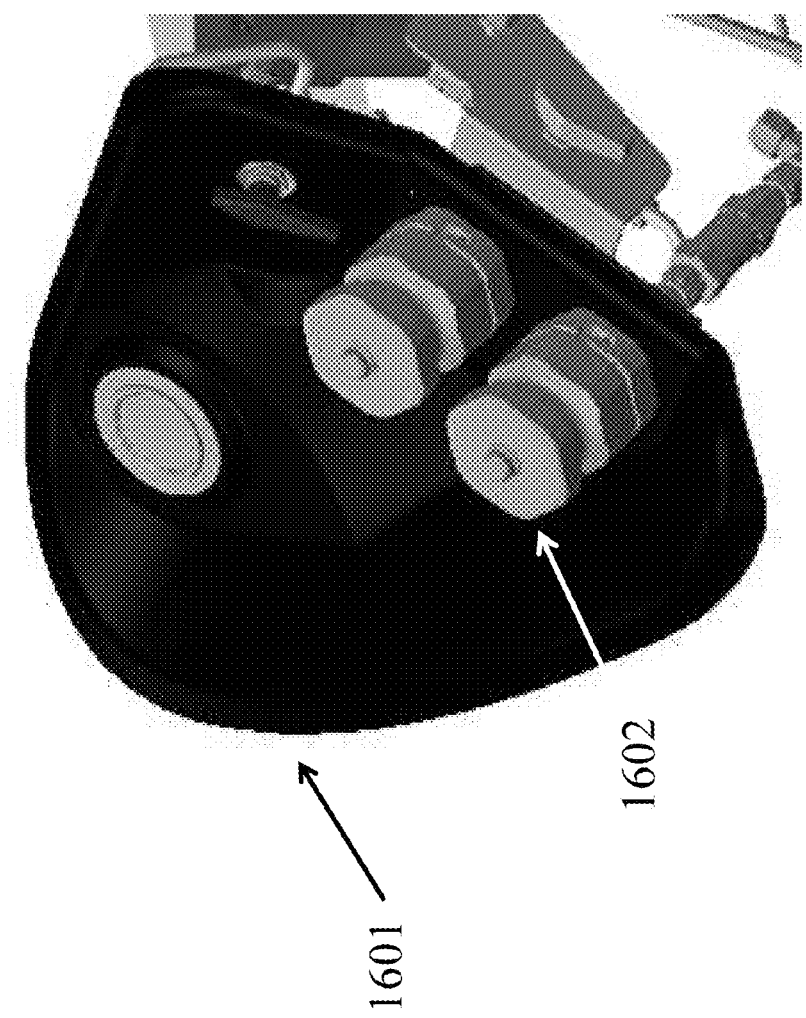
FIG. 16 is a detailed view of a fuel management module.

A fuel management module can be integrated into the cover. The fuel management module integrated in to the cover is shown in FIG. 10. The fuel management module can have an outer cover. The fuel management module outer cover can be made from a formed metallic material, for example aluminum, steel, brass, copper, or titanium. Alternatively the outer cover can be made from a molded plastic or composite material. The side cover can have a thickness of at least 0.005 inches (in), 0.01 in, 0.02 in, 0.03 in, 0.04 in, 0.05 in, 0.06 in, 0.07 in, 0.08 in, 0.09 in, 0.1 in, 0.5 in, or 1.0 in. The outer cover can have holes through which valves and caps that are in physical communication with the fuel tank or fuel cylinder can be accessed by a user. FIG. 11 shows a cross sectional view of the bracket 1101 with a cover 1102 and a fuel management module 1103. The fuel management module 1103 may have flow components such as valves, tubing, and connections that are under the cover 1102. FIG. 16 shows a detailed view of the fuel management module including the exterior interface 1601, and the fuel caps 1602. These components can be mounted on to the faceplate 1104 such that they are recessed below the surface of a cover. Recessing the components can decrease their vulnerability during collision events. The faceplate 1104 can be a part integral with the bracket such that the fuel management module can be connected to the bracket. The fuel management module can have fuel caps 1105 that can be accessed from the outside of the cover 1102. These fuel caps 1105 can be recessed in the cover such that they do not protrude past the surface of the cover. The caps can be recessed such that they are protected from impact with an object during a collision event. The fuel management module can include connections to a fuel flow path that can route fuel to a vehicle engine. Fuel can be provided for power generation in the engine to propel the vehicle.

FIG. 10 depicts an exterior view of an example of a mounting structure that can be used to attach a fuel system to the outside of a vehicle. The mounting structure can have an outer cover 1002. The outer cover can be configured to fit over a fuel system. The outer cover can be configured to mate with a step assembly 1003. The step assembly and the cover can be removed from the bracket in to service the fuel tank when needed. The step assembly 1003 can be removed in one piece. The spacing of the step on the step assembly 1003 may be variable.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of absorbing a horizontal impact force generated by a collision between a vehicle and an object, the method comprising installing on the vehicle a bracket and one or more straps configured to rigidly hold a fuel container during the collision, wherein the one or more straps secure the fuel container to the bracket, wherein a portion of the bracket is positioned at a front or rear of the fuel container, wherein the bracket is connected to a bumper bar disposed along a longitudinal axis of the fuel container, and the bumper bar is configured to transmit the horizontal impact force upon the collision, the horizontal impact force being in a lateral direction toward the vehicle and transverse to a longitudinal axis of the vehicle; and distributing the horizontal impact force from the collision with the bumper bar, wherein a first fraction of the horizontal impact force is distributed to the fuel container through the one or more straps, and a second fraction of the horizontal impact force is distributed to the bracket.

2. The method of claim 1 wherein the bumper bar protrudes laterally further than the fuel container.

3. The method of claim 1 wherein the first fraction of the horizontal impact force distributed to the fuel container is greater than 10% of the horizontal impact force from the collision.

4. The method of claim 1 wherein the first fraction of the horizontal impact force distributed to the fuel container and the second fraction of the horizontal impact force distributed to the bracket have primary directions that differ by greater than 10 degrees.

5. The method of claim 1 wherein the fuel container is configured to house compressed natural gas (CNG).

6. The method of claim 1 wherein the bumper bar has a hollow interior.

7. The method of claim 1 wherein the bumper bar is formed from one or more pieces of sheet metal.

8. The method of claim 1 wherein the bumper bar comprises a rear surface configured to contact (1) the bracket and (2) the one or more straps configured to secure the fuel container.

9. The method of claim 1 wherein the bumper bar comprises a cross section with at least two non-parallel opposing sides.

10. The method of claim 1 wherein the first fraction of the horizontal impact force distributed to the fuel container primarily has a lateral and an upward component, while the second fraction of the horizontal impact force distributed to the bracket primarily has a lateral component.

11. A tank support assembly comprising:
a bracket configured to attach to a vehicle and hold a fuel container for the vehicle during a collision between the vehicle and an object, a portion of the bracket being positioned at a front or rear of the fuel container;
one or more straps configured to secure the fuel container to the bracket; and
a bumper bar connected to the bracket such that the bumper bar is disposed along a longitudinal axis of the fuel container, wherein the bumper bar is configured to transmit a horizontal impact force from the collision, wherein the horizontal impact force is in a lateral direction toward the vehicle and transverse to a longitudinal axis of the vehicle, and
wherein a first fraction of the horizontal impact force is distributed to the fuel container through the one or more straps and a second fraction of the horizontal impact force is distributed to the bracket.

12. The assembly of claim 11 wherein the bumper bar protrudes laterally further than the fuel container.

13. The assembly of claim 11 wherein the first fraction of the horizontal impact force distributed to the fuel container is greater than 10% of the force.

14. The assembly of claim 11 wherein the first fraction of the horizontal impact force distributed to the fuel container and the second fraction of the horizontal impact force distributed to the bracket have primary directions that differ by greater than 10 degrees.

15. The assembly of claim 11 wherein the bumper bar is configured to distribute the horizontal impact force so that the fuel container is not damaged when the horizontal impact force is greater than or equal to 50,000 lb.

16. The assembly of claim 11 wherein the bumper bar is configured to contact the fuel container so that the contact area is at least 5% of the total surface area of the fuel container.

17. The assembly of claim 11 further comprising a cover that overlays the bracket and the bumper bar.

18. The assembly of claim 11 further comprising one or more steps supported by the cover.

19. The assembly of claim 11 wherein the bumper bar has a hollow interior.

20. The assembly of claim 11 wherein the bumper bar comprises a cross section with at least two non-parallel opposing sides.

* * * * *